(12) United States Patent
Czysz

(10) Patent No.: US 6,966,571 B2
(45) Date of Patent: Nov. 22, 2005

(54) MOTORCYCLE SUSPENSION HAVING TRAIL ADJUSTMENT

(75) Inventor: Michael Czysz, Portland, OR (US)

(73) Assignee: MotoCzysz, Portland, OR (US)

(*) Notice: Subject to any disclaimer, the term of this patent is extended or adjusted under 35 U.S.C. 154(b) by 17 days.

(21) Appl. No.: 10/979,546

(22) Filed: Nov. 1, 2004

(65) Prior Publication Data

US 2005/0062255 A1 Mar. 24, 2005

Related U.S. Application Data

(62) Division of application No. 10/633,380, filed on Jul. 31, 2003.

(51) Int. Cl.[7] ................................................ B62K 21/02
(52) U.S. Cl. ................................... 280/279; 180/219
(58) Field of Search .................. 180/219; 280/279, 280/277, 276, 275, 274, 285

(56) References Cited

U.S. PATENT DOCUMENTS

| 4,184,695 | A | * | 1/1980 | Roe et al. ................ 280/277 |
| 4,260,170 | A | * | 4/1981 | Terai et al. .............. 280/276 |
| 4,776,609 | A | * | 10/1988 | Pan et al. ................. 280/276 |
| 5,413,368 | A | * | 5/1995 | Pong et al. ............... 280/277 |
| 5,967,538 | A | * | 10/1999 | Callaluca et al. .......... 280/279 |
| 6,152,472 | A | * | 11/2000 | Woodside ................ 280/277 |
| 6,155,370 | A | * | 12/2000 | Iwai et al. ................ 180/222 |
| 6,260,869 | B1 | * | 7/2001 | Hanlon et al. ............ 280/276 |

* cited by examiner

Primary Examiner—Paul N. Dickson
Assistant Examiner—Tony Winner
(74) Attorney, Agent, or Firm—Richard Calderwood

(57) ABSTRACT

A motorcycle or bicycle having a fork with swappable trail adjustment blocks which hold the front axle to the fork. Trail can be adjusted without removing the forks or even loosening them in the triple clamps, and without altering ride height or rake angle. Brake caliper mounts are swapped when the trail adjustment blocks are swapped, moving the brake calipers the same distance and direction as the axle, to maintain a constant radial distance from the axle to the brake pads. The brake caliper mounts pivot on the forks, enabling the brake calipers to be swung outward so the wheel can be changed without removing the brake calipers from the forks.

14 Claims, 5 Drawing Sheets

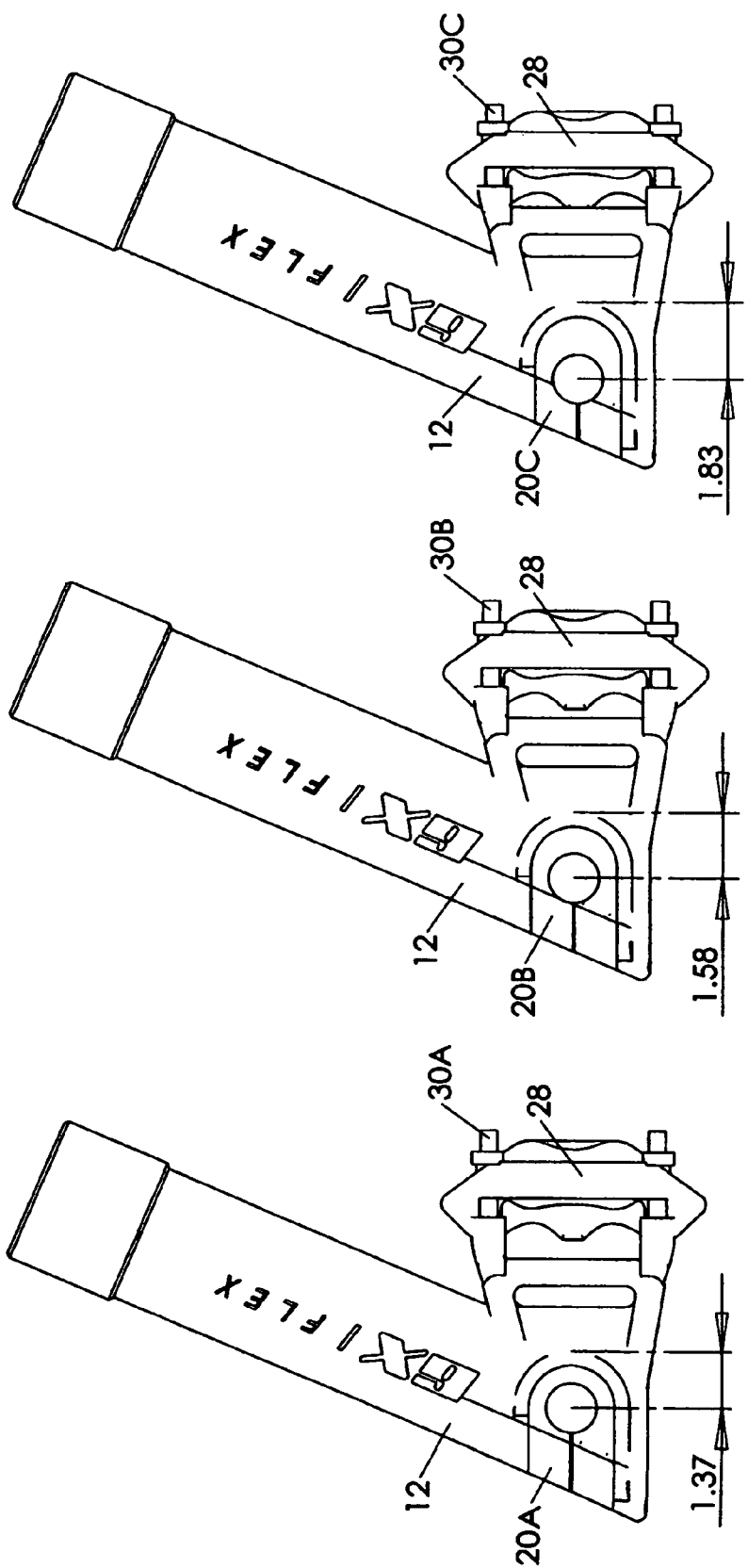

MOTORCYCLE SUSPENSION HAVING TRAIL ADJUSTMENT

RELATED APPLICATION

This application is a divisional of application Ser. No. 10/633,380 "Front End Trail Adjustment for Motorcycle" filed Jul. 31, 2003 by this inventor.

BACKGROUND OF THE INVENTION

1. Technical Field of the Invention

This invention relates generally to front end suspension components for two-wheeled vehicles, and more specifically to a trail adjustment mechanism such as for a motorcycle.

2. Background Art

Trail is the distance, on the ground, from a point projected through the front axle on a line parallel with the steering axis, to a point directly below the front axle, or in other words, to the center of the contact patch. Trail directly impacts the steering stability of the motorcycle and its "return-to-center" force. Trail is affected by rake, which is the angle between vertical and the steering axis; steeper rake reduces trail. Trail is also affected by longitudinal fork offset, or the distance which the fork tubes are set in front of the steering tube; more offset increases trail. Trail is also affected by axle offset; if the axle is coupled to the forks in front of their center, it increases trail.

The rider may wish to increase or decrease trail to, for example, change the steering feel or feedback, to improve steering quickness, or to eliminate a high-speed wobble, or to reduce a front end "push". Often, riders will talk as though they are fixing these things by adjusting the ride height, which is generally discussed in terms of how far the forks extend up through the top triple clamp. However, decreasing front ride height by raising the forks farther through the triple clamps in reality steepens the rake, which, in turn, decreases trail. It is ultimately the change in trail which causes the effects which the rider attributes to his ride height adjustment.

Although adjusting trail can have very beneficial results, the other changes which go along with it in a conventional motorcycle may often—or even usually—outweigh or significantly counteract the benefits of the trail adjustment. For example, lowering ride height obviously puts the frame, engine cases, fairings, and other parts into closer proximity to the racetrack, often to an extent that cornering ability is actually reduced because hard parts of the motorcycle ground out on curbings or even the asphalt itself.

What is needed, then, is a mechanism which facilitates trail adjustments without adversely affecting other geometry characteristics of the motorcycle such as ride height and rake angle.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIGS. 2–4 show the trail adjustment mechanism with three different trail adjustment blocks installed, to achieve three different amounts of trail.

DETAILED DESCRIPTION

Figure 1:
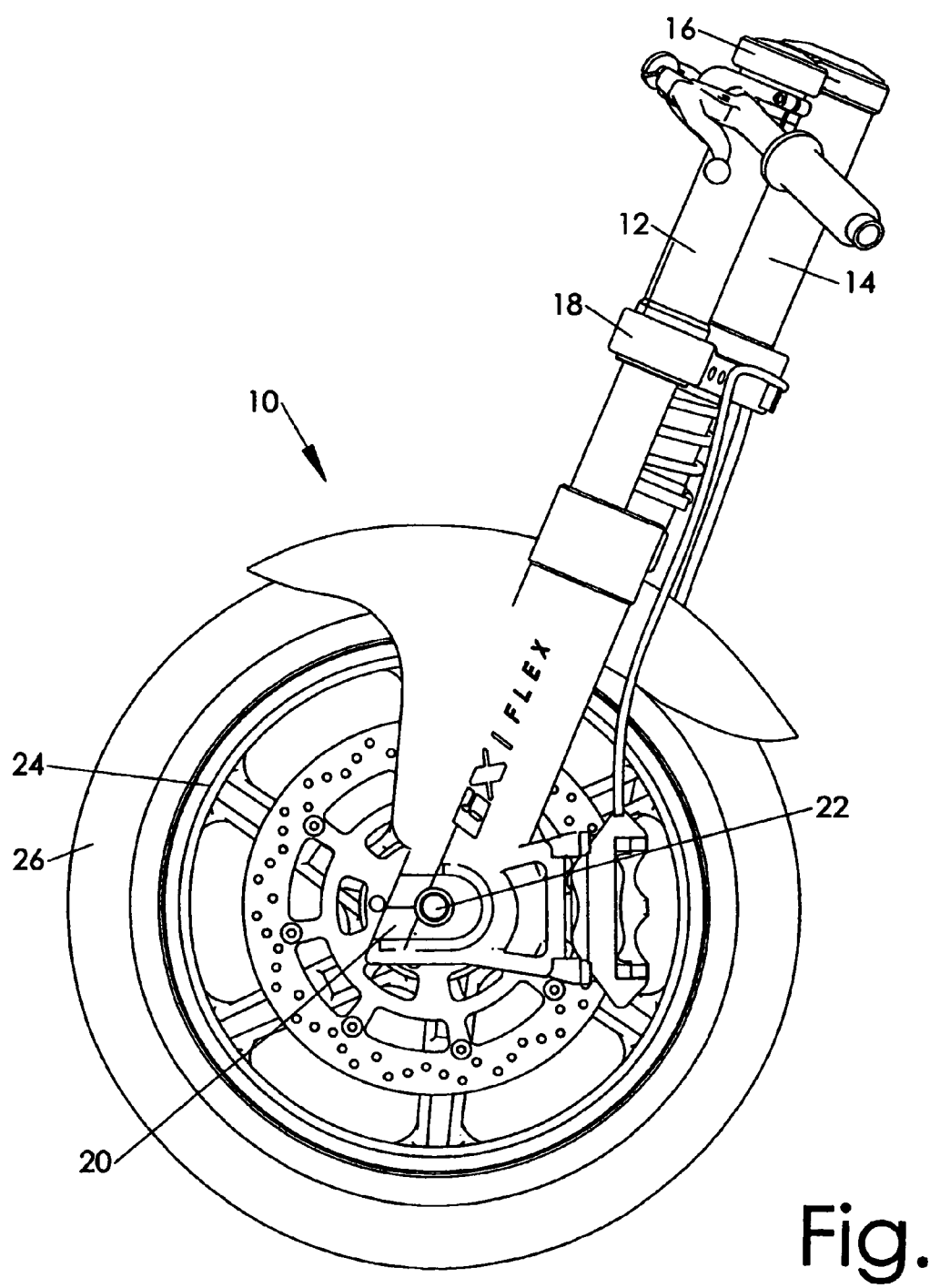
FIG. 1 shows one embodiment of a motorcycle front end equipped with the trail adjustment mechanism of the present invention.

FIG. 1 illustrates a motorcycle front end 10 including a pair of telescopic forks 12 rotatably coupled to a frame steering tube 14 by an upper triple clamp 16 and a lower triple clamp 18. The forks include trail adjustment blocks 20 which secure the front axle 22 to the forks at a predetermined offset with respect to the axis of the steering tube, which in turn dictates a predetermined amount of trail. A wheel 24 and tire 26 are coupled to the front axle.

FIGS. 2–4 illustrate the front end with three different trail blocks installed, producing three different amounts of trail. In FIG. 2, the fork 12 is equipped with a first trail adjustment block 20A which provides a first amount of trail. For the sake of convenience, the trail is represented simplistically as the distance from the axial center of the front axle to the back of the trail adjustment block, rather than as a distance on the ground, but the reader will readily appreciate that the two are interrelated. In the instance of FIG. 2, the trail block offset is 1.37 inches, corresponding to 3.5 inches of trail. The brake caliper 28 is mounted to the fork with a set of first caliper mounts 30A, which are sized to provide a particular distance from the center of the front axle to the brake pads (not shown). In FIG. 3, the fork 12 is equipped with a second trail adjustment block 20B with a trail block offset of 1.58 inches, corresponding to 3.75 inches of trail. The brake caliper 28 is mounted with a set of second caliper mounts 30B which are sized to provide the same distance from the center of the front axle, which has been moved forward relative to its position in FIG. 2, to the brake pads, so the brake pads maintain the same relative position with respect to the brake rotors (not shown, but which will have moved forward along with the front axle). In FIG. 4, the fork 12 is equipped with a third trail adjustment block 20C with a trail block offset of 1.83 inches, corresponding to 4.0 inches of trail, and the brake caliper is mounted with a set of third caliper mounts 20C to keep the same distance from the axle to the brake pads.

It should again be noted that, in one embodiment, the trail adjustment blocks and their mating surface of the fork lower are configured such that the front axle is moved, by the various trail adjustment blocks, in a direction parallel to the ground, such that the front ride height is not changed by swapping out the different trail adjustment blocks. In one embodiment, this is accomplished by providing the trail adjustment block with a top surface and a bottom surface which are parallel, and by positioning the front axle hole at various positions, for the various trail adjustment blocks, which are a same distance from the bottom surface, for example. In other embodiments, other geometries may accomplish the same result.

The trail adjustment block may be tightened onto the axle, and the fork lower may be tightened onto the trail adjustment block, by one or more pinch bolts (not shown) which may advantageously be inserted upward through the bottom end of the fork lower through coaxial holes (not shown) through the portion of the fork lower which is below the trail adjustment block, the portion of the trail adjustment block which is below the pinch split, the portion of the trail adjustment block which is above the pinch split, and the portion of the fork lower which is above the trail adjustment block. In this instance, only the topmost or two topmost of these need to be threaded.

In one embodiment, the brake caliper is mounted not only "radially", but also with its radius parallel to the plane in which the various trail adjustment blocks move the front axle, to maintain a constant positioning of the brake pads and the brake rotor across the various trail settings. In one embodiment, the radius of the brake caliper mount is parallel to the ground.

Figure 5:
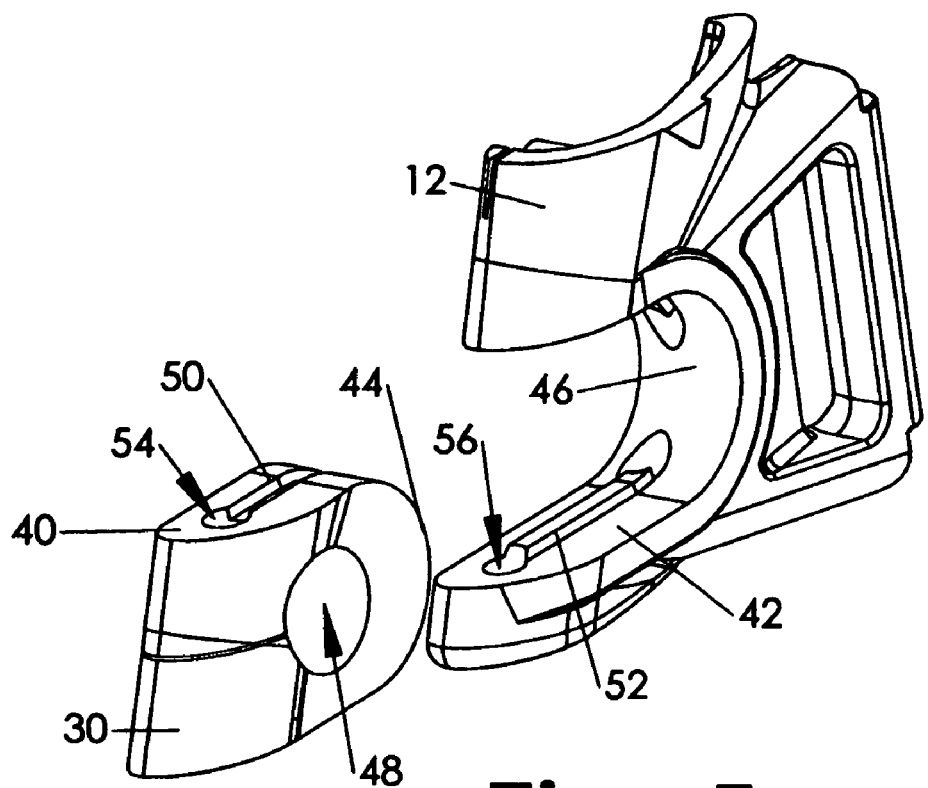
FIG. 5 shows further details of the trail adjustment system.

FIG. 5 illustrates further details of the trail adjustment block 30 and the lower end of the fork 12, specifically illustrating one mechanism by which axial alignment can be achieved. The fork is illustrated in a truncated fashion, for simplicity. The trail adjustment block includes a top surface 40 and a parallel bottom surface (not visible) which, respectively, mate with a top surface (not visible) and a parallel bottom surface 42 of the fork. The back surface 44 of the trail adjustment block mates with a back surface 46 of the fork lower. These matings provide up-and-down and forward-backward alignment of the trail adjustment block with respect to the fork lower. In one embodiment, in order to provide positive and consistent lateral alignment (with respect to the front axle, not shown, but centered in the axle mounting hole 48), the upper and lower surfaces of the trail adjustment block are adapted with parallel grooves 50 which mate with corresponding parallel ridges 52 on the lower and upper surfaces of the fork. Other embodiments are certainly viable, such as swapping the grooves and the ridges, or one of each, or by using mounting pins and holes, or simply by using the corresponding pinch bolt holes 54, and the pinch bolt (not shown).

Figure 6:
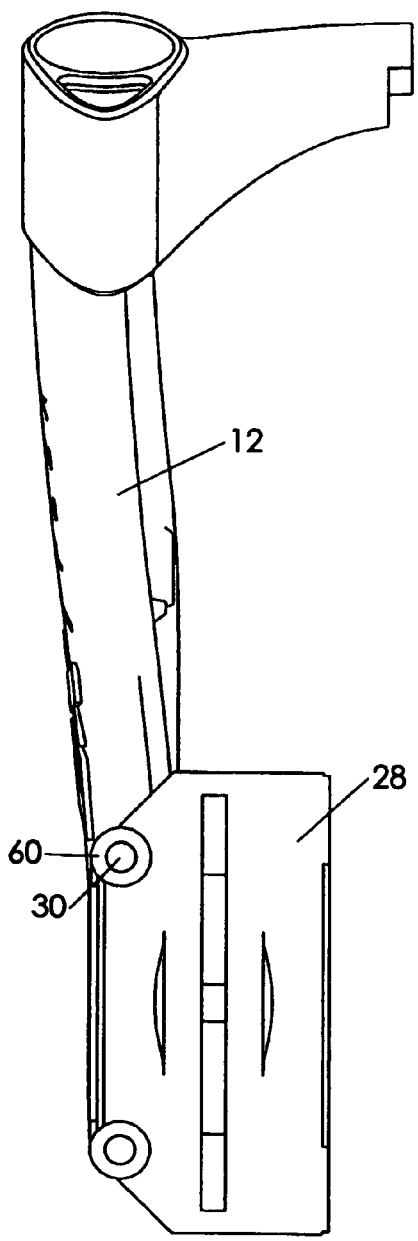
FIGS. 6–7 show rear views of the brake caliper mounting system of the present invention, with the caliper aligned normally in FIG. 6 and swung out in FIG. 7 such as for clearance in unmounting a wheel assembly.
Figure 7:
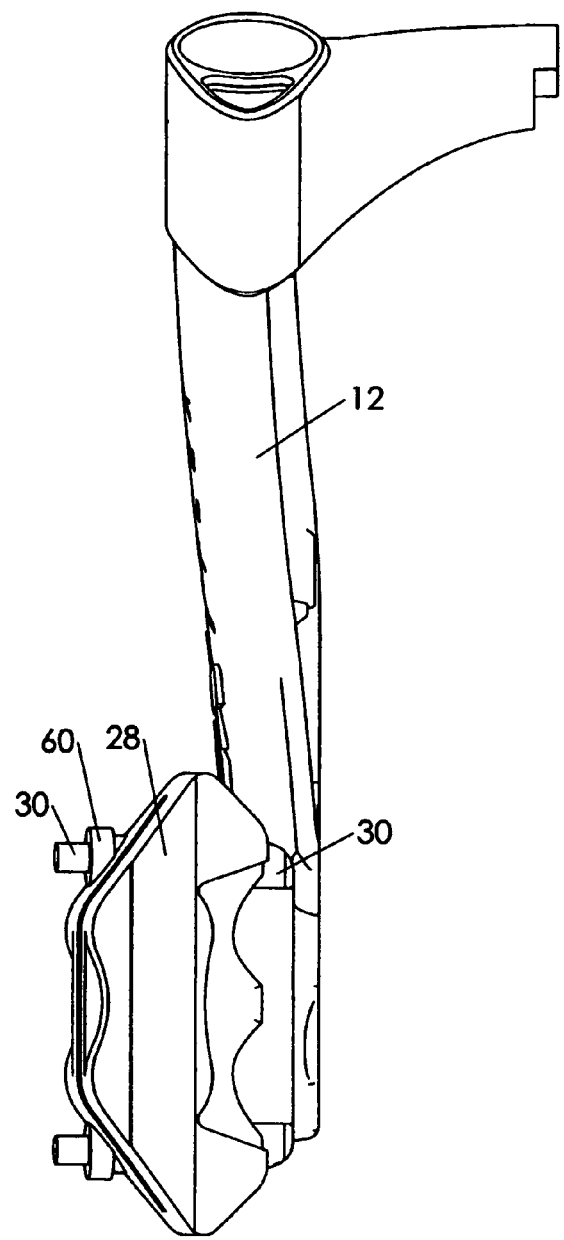

FIGS. 6 and 7 illustrate yet another advantageous feature of this front end. The brake caliper 28 is mounted to the fork 12 by a pair of caliper mounts 30 which can pivot with respect to the fork. Nuts 60 fasten the brake caliper onto the caliper mounts. In FIG. 6, the brake caliper is shown in a "straight back" configuration, such as it would be when the wheel and brake rotor are in place and the brake caliper is engaged with the rotor. In FIG. 7, the brake caliper is shown in a "swung out" configuration, which enables removal of the wheel/tire assembly (not shown), which will typically be wider than the distance between the left and right (not shown) brake calipers. To install the wheel/tire/rotor assembly, the calipers are swung outward, the wheel/tire assembly is inserted from the front of the motorcycle (in a direction coming out of the page in FIGS. 6 and 7) until the tire and/or wheel have cleared the rearward edge of the calipers but the rotors have not yet reached the calipers, the calipers are swung back straight, and the wheel/tire/rotor assembly is inserted the rest of the way into position, with the rotors correctly entering the calipers between the pads, until the trail adjustment blocks encounter the back of their mating surface on the fork lowers. Then the pinch bolts can be inserted and tightened, and the assembly is complete.

Figure 8:
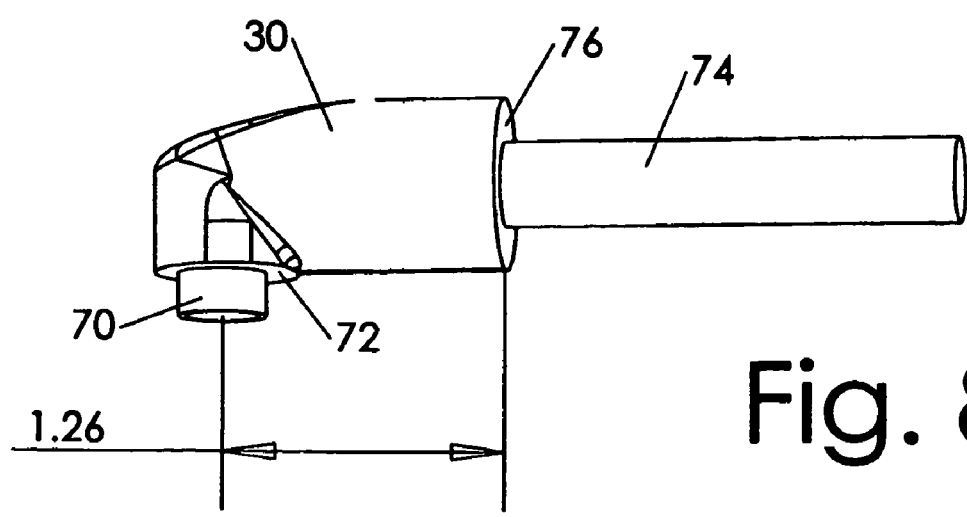
FIG. 8 shows one embodiment of a caliper mount such as may be used with the front end in conjunction with the trail adjustment system.

FIG. 8 illustrates one exemplary embodiment of a caliper mount 30. The caliper mount includes a first cylindrical post 70 which mates with a corresponding hole in the fork (not shown) up flush with the face 72, and a second cylindrical post 74 which mates with a corresponding hole in the brake caliper (not shown) up flush with the face 76. In one embodiment, the two posts are at right angles to each other. In one embodiment, the brake caliper includes two parallel holes for accepting the posts 74 of two caliper mounts, and the fork lower includes two coaxial holes for accepting the posts 70 of the two caliper mounts, to facilitate pivoting of the brake caliper about the common axis of the posts 70 of the two caliper mounts. The post 74 may be adapted with threads or other suitable mechanism for retaining the caliper mount in engagement with the brake caliper, such as with the nut (not shown) mentioned above. The distance from the axis of the first post 70 to the flush mounting surface 76 of the second post dictates the trail adjustment provided by the caliper mount. In the example shown, the distance is 1.26 inches. When a "longer trail" adjustment block is used, such as when swapping from FIG. 2 to FIG. 4, a correspondingly shorter caliper mount will be used, to maintain correct alignment of the pads and rotor.

The skilled reader will readily appreciate that the various components of the caliper mount are not necessarily shown to any particular scale, and that they may be resized and adapted according to the needs of the application at hand. For example, the two posts need not necessarily be of the same diameter, or the post 70 could be made longer than shown, and so forth.

Figure 9:
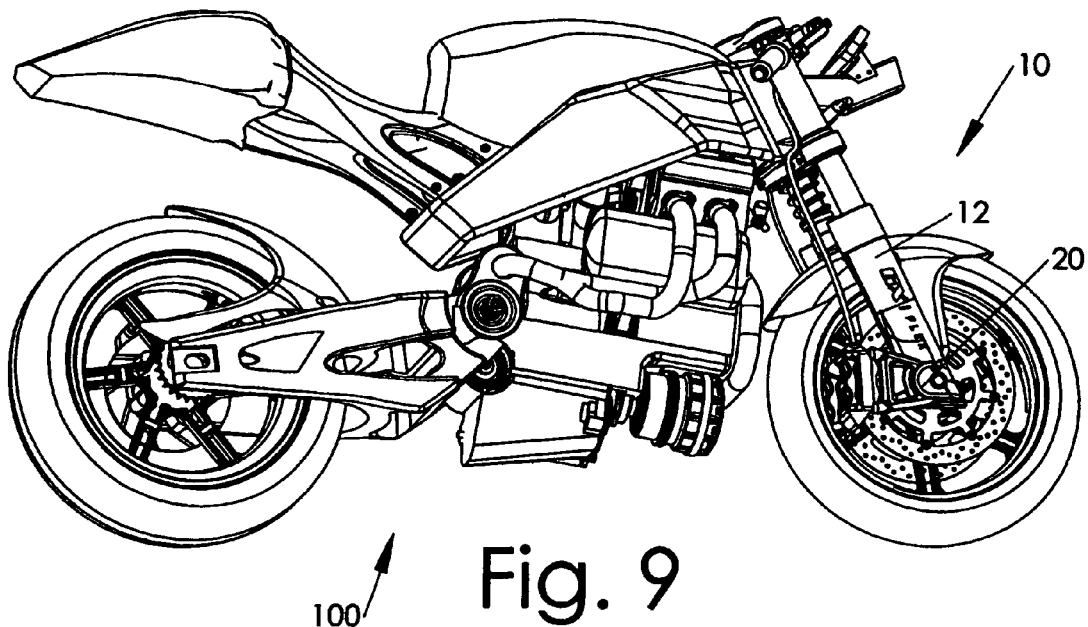
FIG. 9 shows a motorcycle equipped with the trail adjustment mechanism in its front end.

FIG. 9 illustrates one embodiment of a motorcycle 100 equipped with a front end 10 having forks 12 equipped with the trail adjustment mechanism of the present invention, including the fork trail adjustment block 20.

CONCLUSION

While the invention has been described with reference to its use in a motorcycle, the invention is not limited to motorcycles, but can be used in bicycles, automobiles, and other vehicles. And while the invention has been shown as using an "upside-down" fork, it may alternatively be used with a "right-side-up" fork. Some components have been illustrated as being of monolithic construction, while other components have been illustrated as being separate components coupled together. The skilled reader will readily appreciate that the designer may elect, within the scope of this invention, to split some components into separate subcomponents, or to combine various components into a monolithic whole. The skilled reader will further appreciate that the invention may be practiced in a "single-sided" front end, such as that found on some bicycles which have only a single fork. The term "triple clamp" should not necessarily be interpreted to mean that two forks are required with the steering tube. The presence of one or more suspension components coaxial with the steering axis does not necessarily prohibit the additional presence of one or more suspension components elsewhere, such as within the forks.

The fork and the trail adjustment block have been illustrated in a configuration in which the trail adjustment block slips into the front of the fork. In other embodiments, a different mating system could be employed. For example, instead of a void or indentation formed into the front of the fork, the fork could have a hole extending laterally through it, or, in other words, there could be fork material in front of the void, and the trail adjustment block would be inserted laterally rather than longitudinally.

When one component is said to be "adjacent" another component, it should not be interpreted to mean that there is absolutely nothing between the two components, only that they are in the order indicated. The various features illustrated in the figures may be combined in many ways, and should not be interpreted as though limited to the specific embodiments in which they were explained and shown. Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. An apparatus comprising:
   a fork having a void near its bottom end and having a suspension axis;
   a first trail adjustment block adapted to mate with the void of the fork, and including an axle mounting hole for retaining an axle at a first position with respect to the suspension axis when the first trail adjustment block is mated with the void of the fork; and
   a second trail adjustment block adapted to mate with the void of the fork, and including an axle mounting hole for retaining the axle at a second position with respect to the suspension axis when the second trail adjustment block is mated with the void of the fork;
   whereby a trail position of the axle can be altered by swapping the first and second trail adjustment blocks.

2. The apparatus of claim 1 further comprising:
   a third trail adjustment block adapted to mate with the void of the fork, and including an axle mounting hole for retaining the axle at a third position with respect to the suspension axis when the third trail adjustment block is mated with the void of the fork.

3. The apparatus of claim 1 wherein:
   the void of the fork includes an upper surface and a lower surface which are parallel; and
   the trail adjustment blocks each has an upper surface and a lower surface which are parallel.

4. The apparatus of claim 1 wherein:
   the trail adjustment blocks each includes a pinch split.

5. The apparatus of claim 1 wherein:
   the trail adjustment blocks each includes one of a groove and a ridge; and
   the fork includes the other of the groove and the ridge;
   wherein the groove and the ridge are configured to provide lateral alignment of the trail adjustment block and the fork.

6. The apparatus of claim 1 wherein:
   the fork includes a telescoping fork including an upper fork tube and a lower fork tube, and a fork lower;
   wherein the fork lower includes the void.

7. The apparatus of claim 1 wherein:
   the fork includes means for mounting a brake caliper; and
   the apparatus further includes two brake caliper mounts, of different lengths corresponding to a distance from the first position and the second position of the axle; whereby the brake caliper can be moved to maintain a constant radial distance from the axle, when swapping between the first and second trail adjustment blocks.

8. The apparatus of claim 7 wherein:
   the first brake caliper mount comprises a first post and a second post coupled to a body having a first length; and
   the second brake caliper mount comprises a first post and a second post coupled to a body having a second length.

9. The apparatus of claim 8 wherein:
   the first post and the second post of each of the brake caliper mounts are substantially at right angles to each other.

10. The apparatus of claim 9 wherein:
    the brake caliper mounts are rotatably coupled to the fork, whereby the brake caliper can be swung to a side to facilitate mounting a wheel to the axle without removing the brake caliper from the fork.

11. A motorcycle front suspension for use with a motorcycle having a frame, a front axle, and a front wheel coupled to the front axle, the motorcycle front suspension comprising:
    a pair of telescopic forks, wherein each fork includes,
      an upper end for coupling to the motorcycle, and
      a lower end including a trail adjustment block mating surface; and
    a plurality of interchangeable pairs of trail adjustment blocks, wherein each trail adjustment block is adapted to mate with the trail adjustment block mating surface of one of the forks, and wherein each respective pair of trail adjustment blocks positions the front axle in a different position, whereby a trail geometry of the motorcycle can be altered by changing between pairs of trail adjustment blocks.

12. The motorcycle front suspension of claim 11 wherein:
    the pairs of trail adjustment blocks are shaped such that changing between pairs of trail adjustment blocks does not significantly alter a ride height geometry of the motorcycle.

13. The motorcycle front suspension of claim 11 further comprising:
    a pair of brake calipers; and
    a plurality of sets of brake caliper mounts for coupling the brake calipers to the forks, each set corresponding to a respective pair of trail adjustment blocks, whereby the brake calipers can be repositioned with respect to the forks to maintain a substantially constant position relative to the front axle, when changing between pairs of trail adjustment blocks.

14. The motorcycle front suspension of claim 13 wherein:
    the brake caliper mounts pivot laterally with respect to the forks, whereby the brake calipers can be pivoted aside to facilitate installation of the front wheel.

* * * * *